United States Patent
Hasegawa et al.

(10) Patent No.: US 9,871,402 B2
(45) Date of Patent: Jan. 16, 2018

(54) ELECTRIC POWER CONVERSION APPARATUS AND METHOD OF CONTROLLING THE SAME

(71) Applicant: TOYOTA JIDOSHA KABUSHIKI KAISHA, Toyota-shi, Aichi-ken (JP)

(72) Inventors: Naoto Hasegawa, Seto (JP); Shoichi Shono, Miyoshi (JP); Masafumi Uchihara, Toyota (JP); Mitsuhiro Miura, Toyota (JP); Fumiki Tanahashi, Toyota (JP); Jun Muto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 267 days.

(21) Appl. No.: 14/677,213

(22) Filed: Apr. 2, 2015

(65) Prior Publication Data
US 2015/0295445 A1    Oct. 15, 2015

(30) Foreign Application Priority Data
Apr. 9, 2014    (JP) .................................. 2014-080484

(51) Int. Cl.
*H02J 7/00*    (2006.01)
*H02J 7/14*    (2006.01)

(52) U.S. Cl.
CPC .......... *H02J 7/1423* (2013.01); *H02J 7/0054* (2013.01); *Y02T 10/7005* (2013.01)

(58) Field of Classification Search
CPC combination set(s) only.
See application file for complete search history.

(56) References Cited

U.S. PATENT DOCUMENTS

| 9,203,322 | B2* | 12/2015 | Muto | H02M 3/33592 |
| 9,537,408 | B2* | 1/2017 | Hirano | H02M 3/33546 |
| 2008/0101096 | A1* | 5/2008 | Takayanagi | H02J 7/0013 363/17 |
| 2011/0198933 | A1* | 8/2011 | Ishigaki | B60R 25/00 307/66 |
| 2014/0167656 | A1 | 6/2014 | Yamada | |

FOREIGN PATENT DOCUMENTS

| CN | 1473724 A | 2/2004 |
| CN | 103635822 A | 3/2014 |
| JP | 2011-193713 A | 9/2011 |

* cited by examiner

*Primary Examiner* — Samuel Berhanu
(74) *Attorney, Agent, or Firm* — Andrews Kurth Kenyon LLP

(57) ABSTRACT

Assuming that a transformer has a primary to secondary winding turn ratio 1:N, VR denotes a voltage of regenerated power, VCd denotes a discharge final voltage of a first battery connected with a transformer-primary-side center tap, VCc denotes a charge final voltage of the first battery, VBd denotes a discharge final voltage of a second battery connected with a transformer-secondary-side full bridge circuit, VBc denotes a charge final voltage of the second battery and Drain denotes a lower limit of a duty ratio D of a transformer-primary-side full bridge circuit, an apparatus determines upon (VBd/N)≤VR≤(VBc/N) that the first and second batteries may be able to be charged with regenerated power and determines upon VCd≤VR≤(VCc/Dmin) that the first battery may be able to be charged with the regenerated power.

19 Claims, 6 Drawing Sheets

ELECTRIC POWER CONVERSION APPARATUS AND METHOD OF CONTROLLING THE SAME

BACKGROUND OF THE INVENTION

1. Field of the Invention

The present invention relates to an electric power conversion apparatus and a method of controlling the same.

2. Description of the Related Art

An electric power conversion apparatus is known which converts electric power among a plurality of ports to which loads or batteries are connected (for example, see Japanese Laid-Open Patent Application No. 2011-193713).

SUMMARY OF THE INVENTION

According to an aspect of the present invention, an electric power conversion apparatus includes a transformer having a winding turn ratio 1:N between a primary side and a secondary side; a primary-side full bridge circuit provided at the primary side of the transformer; a first port connected with the primary-side full bridge circuit; a second port connected with a center tap at the primary side of the transformer; a secondary-side full bridge circuit provided at the secondary side of the transformer; a third port connected with the secondary-side full bridge circuit; and a control part configured to control the primary-side full bridge circuit and the secondary-side full bridge circuit in such a manner that regenerated power that is input from the first port is used to charge at least one of a first battery connected with the second port and a second battery connected with the third port. The control part is configured to determine, when a condition $(VBd/N) \leq VR \leq (VBc/N)$ is met, that there is a possibility of being able to use the regenerated power to charge the first battery and the second battery and determine, when a condition $VCd \leq VR \leq (VCc/Dmin)$ is met, that there is a possibility of being able to use the regenerated power to charge the first battery. Here, VR denotes a voltage of the regenerated power, VCd denotes a discharge final voltage of the first battery, VCc denotes a charge final voltage of the first battery, VBd denotes a discharge final voltage of the second battery, VBc denotes a charge final voltage of the second battery, and Dmin denotes a lower limit of a duty ratio D of the primary-side full bridge circuit.

Other objects, features and advantages of the present invention will become more apparent from the following detailed description when read in conjunction with the accompanying drawings.

DETAILED DESCRIPTION OF THE EMBODIMENT

Below, using the accompanying drawings, an embodiment of the present invention will be described.

The embodiment relates to a technology of converting electric power among a plurality of ports.

When a load connected with a port of an electric power conversion apparatus generates regenerated power, the voltage of the regenerated power (i.e., a regenerated voltage) that is input from the port may have various values depending on states of the load (for example, the rotational speed of a motor, or such). In contrast thereto, a voltage range in which a battery is capable of recovering energy using (being charged with) regenerated power is restricted. Therefore, when the regenerated voltage does not fall within the voltage range, it may be impossible to recover energy using the regenerated power.

An object of the embodiment is to provide an electric power conversion apparatus and a method of controlling the same, by which it is possible to appropriately select a battery capable of recovering energy using regenerated power.

<Configuration of Power Supply Apparatus 101>

Figure 1:
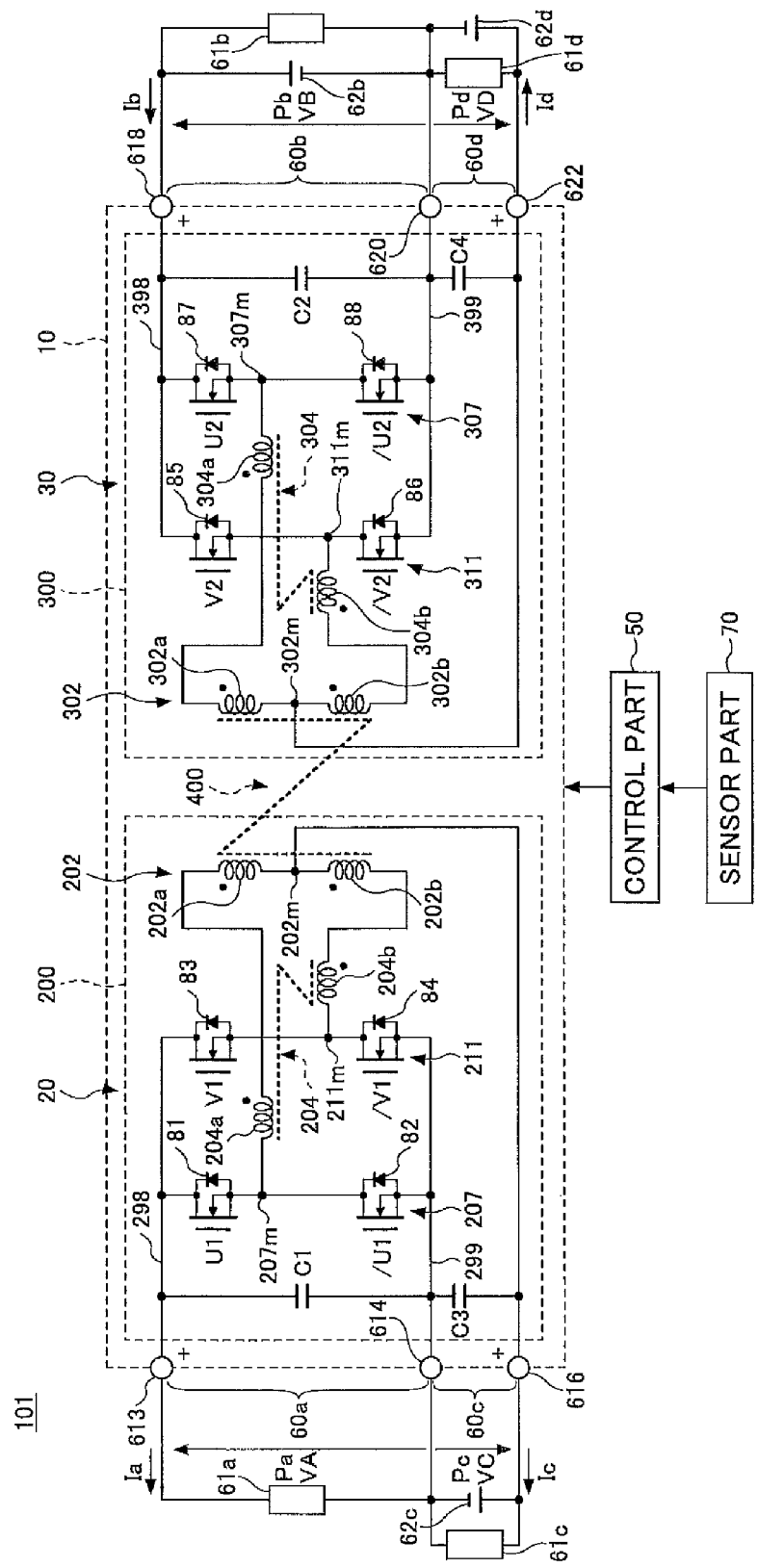
FIG. 1 illustrates a configuration example of an electric power conversion apparatus.

FIG. 1 is a block diagram illustrating a configuration example of a power supply apparatus 101 according to one embodiment of an electric power conversion apparatus. The power supply apparatus 101 is, for example, a power supply system including a power supply circuit 10, a control part 50 and a sensor part 70. The power supply apparatus 101 is, for example, a system mounted in a vehicle such as an automobile and distributes electric power to respective loads mounted in the vehicle. As a specific example of such a vehicle, a hybrid car, a plug-in hybrid car, an electric car or the like can be cited. The power supply apparatus 101 can also be mounted in a vehicle that is driven mainly by an internal-combustion engine.

The power supply apparatus 101 includes, for example, a first input/output port 60a to which a primary-side high-voltage-system load 61a is connected and a second input/output port 60c to which a primary-side low-voltage-system load 61c and an auxiliary battery 62c are connected, as primary-side ports. The auxiliary battery 62c is one example of a primary-side low-voltage-system power source that supplies electric power to the primary-side low-voltage-system load 61c driven by the same voltage system (for example, a 12 V system) as the auxiliary battery 62c. The auxiliary battery 62c also supplies electric power, boosted by a primary-side conversion circuit 20 included in the power supply circuit 10, to, for example, the primary-side high-voltage-system load 61a driven by a voltage system (for example, a 48 V system higher in voltage than the 12 V system) different from the auxiliary battery 62c. As a specific example of the auxiliary battery 62c, a secondary battery such as a lead battery can be cited.

The power supply apparatus 101 also has, for example, a third input/output port 60b to which a secondary-side high-voltage-system load 61b and a main battery (i.e., a propulsion battery or a traction battery) 62b are connected and a fourth input/output port 60d to which a secondary-side low-voltage-system load 61d and a secondary-side low-voltage-system power source 62d are connected, as secondary-side ports. The main battery 62b is one example of a secondary-side high-voltage-system power source that supplies electric power to a secondary-side high-voltage-system load 61b driven by the same voltage system (for example, a 288 V system higher in voltage than the 12 V system and the 48 V system) as the main battery 62b. The main battery 62b also supplies electric power, stepped-down by a secondary-side conversion circuit 30 included in the power supply circuit 10, to, for example, a secondary-side low-voltage-system load 61d driven by a voltage system (for example, a 72 V system lower in voltage than the 288 V system) different from the main battery 62b. As a specific example of the main battery 62b, a secondary battery such as a lithium-ion battery can be cited.

The secondary-side low-voltage-system power source 62d supplies electric power to the secondary-side low-voltage-system load 61d driven by the same voltage system (for example, the 72 V system) as the secondary-side low-voltage-system power source 62d. The secondary-side low-voltage-system power source 62d also supplies electric power, boosted by the secondary-side conversion circuit 30 included in the power supply circuit 10, to, for example, the secondary-side high-voltage-system load 61b driven by the voltage system (for example, the 288 V system) higher in voltage than the secondary-side low-voltage-system power source 62d. As a specific example of the secondary-side low-voltage-system power source 62d, a solar power source (i.e., a solar generator), a DC-AC converter that converts commercial AC power to DC power, a secondary battery or the like can be cited.

The power supply circuit 10 has the above-mentioned four input/output ports, and any two input/output ports are selected from among the four input/output ports. The power supply circuit 10 is an electric power conversion apparatus that carries out electric power conversion between the thus selected two input/output ports. Note that the power supply apparatus 101 including the power supply circuit 10 can be an apparatus having a plurality of, at least three or more input/output ports and being able to convert electric power between any two input/output ports among the input/output ports. For example, the power supply circuit 10 can be a circuit having three input/output ports except the fourth input/output port 60d.

Port power Pa, Pc, Pb and Pd denote input/output power (i.e., input power or output power) to/from the first input/output port 60a, the second input/output port 60c, the third input/output port 60b and the fourth input/output port 60d, respectively. Port voltages VA, VC, VB and VD denote input/output voltages (i.e., input voltages or output voltages) at the first input/output port 60a, the second input/output port 60c, the third input/output port 60b and the fourth input/output port 60d, respectively. Port currents Ia, Ic, Ib and Id denote input/output currents (i.e., input currents or output currents) to/from the first input/output port 60a, the second input/output port 60c, the third input/output port 60b and the fourth input/output port 60d, respectively.

The power supply circuit 10 includes a capacitor C1 connected with the first input/output port 60a, a capacitor C3 connected with the second input/output port 60c, a capacitor C2 connected with the third input/output port 60b and a capacitor C4 connected with the fourth input/output port 60d. As specific examples of the capacitors C1, C2, C3 and C4, film capacitors, aluminum electrolytic capacitors, ceramic capacitors, solid polymer capacitors or the like can be cited.

The capacitor C1 is inserted between a high-potential-side terminal 613 of the first input/output port 60a and a low-potential-side terminal 614 of the first input/output port 60a and the second input/output port 60c. The capacitor C3 is inserted between a high-potential-side terminal 616 of the second input/output port 60c and the low-potential-side terminal 614 of the first input/output port 60a and the second input/output port 60c. The capacitor C2 is inserted between a high-potential-side terminal 618 of the third input/output port 60b and a low-potential-side terminal 620 of the third input/output port 60b and the fourth input/output port 60d. The capacitor C4 is inserted between a high-potential-side terminal 622 of the fourth input/output port 60d and the low-potential-side terminal 620 of the third input/output port 60b and the fourth input/output port 60d.

The capacitors C1, C2, C3 and C4 can be installed inside the power supply circuit 10 or outside the power supply circuit 10.

The power supply circuit 10 is an electric power conversion circuit including the primary-side conversion circuit 20 and the secondary-side conversion circuit 30. Note that the primary-side conversion circuit 20 and the secondary-side conversion circuit 30 are connected via primary-side magnetic coupling reactors 204 and secondary-side magnetic coupling reactors 304, and also, are magnetically coupled by a transformer 400 (i.e., a center-tap-type transformer). The primary-side ports including the first input/output port 60a and the second input/output port 60c and the secondary-side ports including the third input/output port 60b and the fourth input/output port 60d are connected via the transformer 400.

The primary-side conversion circuit 20 is a primary-side circuit including a primary-side full bridge circuit 200, the first input/output port 60a and the second input/output port 60c. The primary-side full bridge circuit 200 is provided at the primary side of the transformer 400. The primary-side full bridge circuit 200 is a primary-side power conversion part including a primary coil 202 of the transformer 400, the primary-side magnetic coupling reactors 204, a primary-side first upper arm U1, a primary-side first lower arm /U1, a primary-side second upper arm V1 and a primary-side second lower arm /V1. The primary-side first upper arm U1, the primary-side first lower arm /U1, the primary-side second upper arm V1 and the primary-side second lower arm /V1 are, for example, switching devices including N-channel MOSFETs and body diodes (i.e., parasitic diodes) that are parasitic elements of the MOSFETs, respectively. Diodes can be additionally connected to the MOSFETs in parallel. FIG. 1 illustrates the diodes 81, 82, 83 and 84.

The primary-side full bridge circuit 200 includes a primary-side positive bus 298 connected with the high-potential-side terminal 613 of the first input/output port 60a and a primary-side negative bus 299 connected with the low-potential-side terminal 614 of the first input/output port 60a and the second input/output port 60c.

Between the primary-side positive bus 298 and the primary-side negative bus 299, a primary-side first arm circuit 207 is connected where the primary-side first upper arm U1 and the primary-side first lower arm /U1 are connected in series. The primary-side first arm circuit 207 is a primary-side first power conversion circuit part capable of carrying out a power conversion operation through turning-on/off switching operations of the primary-side first upper arm U1 and the primary-side first lower arm /U1 (i.e., a primary-side U-phase power conversion circuit part). Also, between the primary-side positive bus 298 and the primary-side negative bus 299, a primary-side second arm circuit 211 is connected where the primary-side second upper arm V1 and the primary-side second lower arm /V1 are connected in series, parallel to the primary-side first arm circuit 207. The primary-side second arm circuit 211 is a primary-side second power conversion circuit part capable of carrying out a power conversion operation through turning-on/off switching operations of the primary-side second upper arm V1 and the primary-side second lower arm /V1 (i.e., a primary-side V-phase power conversion circuit part).

In a bridge part connecting the midpoint 207m of the primary-side first arm circuit 207 and the midpoint 211m of the primary-side second arm circuit 211, the primary coil 202 and the primary-side magnetic coupling reactors 204 are provided. In more detail of connection relationship in the bridge part, one end of a primary-side first reactor 204a of the primary-side magnetic coupling reactors 204 is connected to the midpoint 207m of the primary-side first arm circuit 207. To the other end of the primary-side first reactor 204a, one end of the primary coil 202 is connected. Also, to the other end of the primary coil 202, one end of a primary-side second reactor 204b of the primary-side magnetic coupling reactors 204 is connected. Further, the other end of the primary-side second reactor 204b is connected to the midpoint 211m of the primary-side second arm circuit 211. Note that the primary-side magnetic coupling reactors 204 include the primary-side first reactor 204a and the primary-side second reactor 204b that is magnetically connected to the primary-side first reactor 204a with a coupling coefficient $k_1$.

The midpoint 207m is a primary-side first mid node between the primary-side first upper arm U1 and the primary-side first lower arm /U1. The midpoint 211m is a primary-side second mid node between the primary-side second upper arm V1 and the primary-side second lower arm /V1.

The first input/output port 60a is connected to the primary-side full bridge circuit 200 and is a port provided between the primary-side positive bus 298 and the primary-side negative bus 299. The first input/output port 60a includes the terminals 613 and 614. The second input/output port 60c is connected to a center tap 202m at the primary side of the transformer 400, and is a port provided between the primary-side negative bus 299 and the center tap 202m of the primary coil 202. The second input/output port 60c includes the terminals 614 and 616.

The center tap 202m is connected to the high-potential-side terminal 616 of the second input/output port 60c. The center tap 202m is a mid connection point between a first primary winding 202a and a second primary winding 202b of the primary coil 202.

The secondary-side conversion circuit 30 is a secondary-side circuit including the secondary-side full bridge circuit 300, the third input/output port 60b and the fourth input/output port 60d. The secondary-side full bridge circuit 300 is provided at the secondary side of the transformer 400. The secondary-side full bridge circuit 300 is a secondary-side power conversion part including a secondary coil 302 of the transformer 400, the secondary-side magnetic coupling reactors 304, the secondary-side first upper arm U2, the secondary-side first lower arm /U2, the secondary-side second upper arm V2 and the secondary-side second lower arm /V2. The secondary-side first upper arm U2, the secondary-side first lower arm /U2, the secondary-side second upper arm V2 and the secondary-side second lower arm /V2 are, for example, switching devices including N-channel MOSFETs and body diodes (i.e., parasitic diodes) that are parasitic elements of the MOSFETs, respectively. Diodes can be additionally connected to the MOSFETs in parallel. FIG. 1 illustrates the diodes 85, 86, 87 and 88.

The secondary-side full bridge circuit 300 includes a secondary-side positive bus 398 connected to the high-potential-side terminal 618 of the third input/output port 60b and a secondary-side negative bus 399 connected to the low-potential-side terminal 620 of the third input/output port 60b and the fourth input/output port 60d.

A secondary-side first arm circuit 307 where the secondary-side first upper arm U2 and the secondary-side first lower arm /U2 are connected in series is connected between the secondary-side positive bus 398 and the secondary-side negative bus 399. The secondary-side first arm circuit 307 is a secondary-side first power conversion circuit part capable of carrying out a power conversion operation through turning-on/off switching operations of the secondary-side first upper arm U2 and the secondary-side first lower arm /U2 (i.e., a secondary-side U-phase power conversion circuit part). Also, between the secondary-side positive bus 398 and the secondary-side negative bus 399, a secondary-side second arm circuit 311 is connected where the secondary-side second upper arm V2 and the secondary-side second lower arm /V2 are connected in series, parallel to the secondary-side first arm circuit 307. The secondary-side second arm circuit 311 is a secondary-side second power conversion circuit part capable of carrying out a power conversion operation through turning-on/off switching operations of the secondary-side second upper arm V2 and the secondary-side second lower arm /V2 (i.e., a secondary-side V-phase power conversion circuit part).

In a bridge part connecting the midpoint 307m of the secondary-side first arm circuit 307 and the midpoint 311m of the secondary-side second arm circuit 311, the secondary coil 302 and the secondary-side magnetic coupling reactors 304 are provided. In more detail of connection relationships in the bridge part, one end of a secondary-side first reactor 304a of the secondary-side magnetic coupling reactors 304 is connected to the midpoint 307m of the secondary-side first arm circuit 307. To the other end of the secondary-side first reactor 304a, one end of the secondary coil 302 is connected. Also, to the other end of the secondary coil 302, one end of a secondary-side second reactor 304b of the secondary-side magnetic coupling reactors 304 is connected. Further, the other end of the secondary-side second reactor 304b is connected to the midpoint 311m of the secondary-side second arm circuit 311. Note that the secondary-side magnetic coupling reactors 304 include the secondary-side first reactor 304a, and the secondary-side second reactor 304b magnetically connected to the secondary-side first reactor 304a with a coupling coefficient $k_2$.

The midpoint 307m is a secondary-side first mid node between the secondary-side first upper arm U2 and the secondary-side first lower arm /U2. The midpoint 311m is a secondary-side second mid node between the secondary-side second upper arm V2 and the secondary-side second lower arm /V2.

The third input/output port 60b is connected to the secondary-side full bridge circuit 300 and is a port provided between the secondary-side positive bus 398 and the secondary-side negative bus 399. The third input/output port 60b includes the terminals 618 and 620. The fourth input/output port 60d is connected to a center tap 302m at the secondary side of the transformer 400, and is a port provided between the secondary-side negative bus 399 and the center tap 302m of the secondary coil 302. The fourth input/output port 60d includes the terminals 620 and 622.

The center tap 302m is connected to the high-potential-side terminal 622 of the fourth input/output port 60d. The center tap 302m is a mid connection point between a first secondary winding 302a and a second secondary winding 302b of the secondary coil 302.

In FIG. 1, the power supply apparatus 101 includes the sensor part 70. The sensor part 70 is a detection part detecting an input/output value Y at, at least one port of the first through fourth input/output ports 60a, 60c, 60b and 60d with a detection period and outputting a detection value Yd corresponding to the thus detected input/output value Y to the control part 50. The detection value Yd can be a detection voltage acquired from detecting the input/output voltage, a detection current acquired from detecting the input/output current or detection power acquired from detecting the input/output power. The sensor part 70 can be installed inside or outside the power supply circuit 10.

The sensor part 70 includes, for example, a voltage detection part that detects the input/output voltage appearing at, at least one of the first through fourth input/output ports 60a, 60c, 60b and 60d. The sensor part 70 includes, for example, a primary-side voltage detection part that detects, as a primary-side voltage detection value, at least one of the port voltages VA and VC and a secondary-side voltage detection part that detects, as a secondary-side voltage detection value, at least one of the port voltages VB and VD.

The voltage detection part of the sensor part 70 includes, for example, a voltage sensor that monitors the input/output voltage value of at least one port and a voltage detection circuit that outputs a detection voltage corresponding to the input/output voltage value monitored by the voltage sensor to the control part 50.

The sensor part 70 includes, for example, a current detection part that detects the input/output current flowing through, at least one of the first through fourth input/output ports 60a, 60c, 60b and 60d. The sensor part 70 includes, for example, a primary-side current detection part that detects, as a primary-side current detection value, at least one of the port currents Ia and Ic and a secondary-side current detection part that detects, as a secondary-side current detection value, at least one of the port currents Ib and Id.

The current detection part of the sensor part 70 includes, for example, a current sensor that monitors the input/output current value of at least one port and a current detection circuit that outputs a detection current corresponding to the input/output current value monitored by the current sensor to the control part 50.

The power supply apparatus 101 includes the control part 50. The control part 50 is, for example, an electronic circuit including a microcomputer having a CPU inside. The control part 50 can be installed inside or outside the power supply circuit 10.

The control part 50 carries out feedback control of the power conversion operations of the power supply circuit 10 in such a manner that the detection value Yd of the input/output value of at least one of the first through fourth input/output ports 60a, 60c, 60b and 60d will converge to a target value Yo that is set for the port. The target value Yo is an instruction value that is, for example, set by the control part 50 or a predetermined device other than the control part 50 based on a driving condition prescribed for each load (for example, the primary-side low-voltage-system load 61c or so) connected to each input/output port. The target value Yo functions as an output target value when power is output by the port and functions as an input target value when power is input to the port. The target value Yo can be a target voltage value, a target current value or a target power value.

The control part 50 also carries out feedback control of the power conversion operations of the power supply circuit 10 in such a manner that the transmission power P transmitted between the primary-side conversion circuit 20 and the secondary-side conversion circuit 30 via the transformer 400 will converge to target transmission power Po that is set. The transmission power can also be called a power transmission amount. The target transmission power can also be called an instruction transmission power.

The control part 50 can carry out feedback control of the power conversion operations of the power supply circuit 10 by changing values of predetermined control parameters X and adjust the input/output value Y of each of the first through fourth input/output ports 60a, 60c, 60b and 60d of the power supply circuit 10. As main control parameters X, two sorts of control variants, i.e., phase differences φ and duty ratios D (turn-on times δ), can be cited.

The phase differences φ are time lags in switching timing between the power conversion circuits of the same phases between the primary-side full bridge circuit 200 and the secondary-side full bridge circuit 300. The duty ratios D (the turn-on times δ) are duty ratios (turn-on times) of switching waveforms in the respective power conversion circuits in the primary-side full bridge circuit 200 and the secondary-side full bridge circuit 300.

These two types of control parameters X can be controlled mutually independently. The control part 50 changes the input/output value Y at each of the input/output ports of the power supply circuit 10 by carrying out duty-ratio control and/or phase control of the primary-side full bridge circuit 200 and the secondary-side full bridge circuit 300 using the phase differences φ and the duty ratios D (the turn-on times δ).

Figure 2:
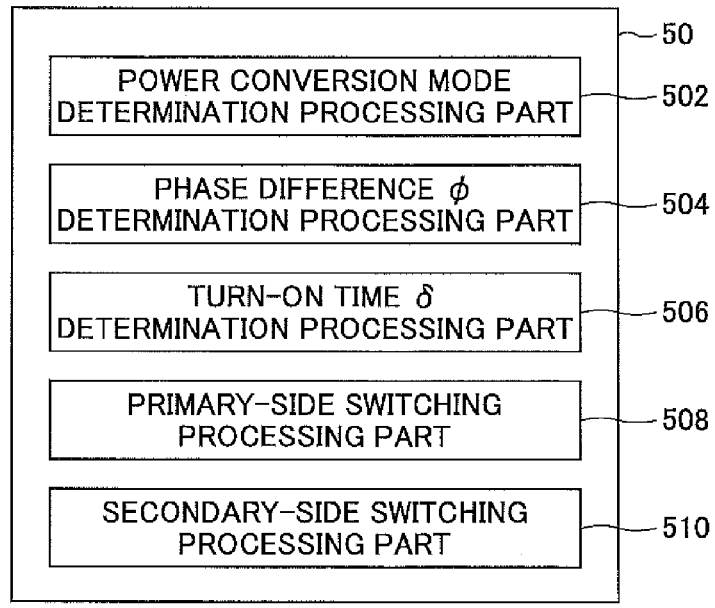
FIG. 2 is a block diagram illustrating a configuration example of a control part.

FIG. 2 is a block diagram of the control part 50. The control part 50 carries out switching control of each switching device such as the primary-side first upper arm U1 in the primary-side conversion circuit 20 and each switching device such as the secondary-side first upper arm U2 in the secondary-side conversion circuit 30. The control part 50 includes a power conversion mode determination processing part 502, a phase difference φ determination processing part 504, a turn-on time δ determination processing part 506, a primary-side switching processing part 508 and a secondary-side switching processing part 510. The control part 50 is, for example, an electronic circuit having a microcomputer with a CPU inside.

The power conversion mode determination processing part 502 determines an operation mode from among power conversion modes A, B, C, . . . , and L (A-L) of the power supply circuit 10 which will be described below based on, for example, a predetermined external signal (for example, a signal indicating a deviation between the detection value Yd and the target value Yo at any port). The power conversion mode A is a mode of converting the power that is input from the first input/output port 60a and outputting the converted power to the second input/output port 60c. The power conversion mode B is a mode of converting the power that is input from the first input/output port 60a and outputting the converted power to the third input/output port 60b. The power conversion mode C is a mode of converting the power that is input from the first input/output port 60a and outputting the converted power to the fourth input/output port 60d.

The power conversion mode D is a mode of converting the power that is input from the second input/output port 60c and outputting the converted power to the first input/output port 60a. The power conversion mode E is a mode of converting the power that is input from the second input/output port 60c and outputting the converted power to the third input/output port 60b. The power conversion mode F is a mode of converting the power that is input from the second input/output port 60c and outputting the converted power to the fourth input/output port 60d.

The power conversion mode G is a mode of converting the power that is input from the third input/output port 60b and outputting the converted power to the first input/output port 60a. The power conversion mode H is a mode of converting the power that is input from the third input/output port 60b and outputting the converted power to the second input/output port 60c. The power conversion mode I is a mode of converting the power that is input from the third input/output port 60b and outputting the converted power to the fourth input/output port 60d.

The power conversion mode J is a mode of converting the power that is input from the fourth input/output port 60d and outputting the converted power to the first input/output port 60a. The power conversion mode K is a mode of converting the power that is input from the fourth input/output port 60d and outputting the converted power to the second input/output port 60c. The power conversion mode L is a mode of converting the power that is input from the fourth input/output port 60d and outputting the converted power to the third input/output port 60b.

The phase difference $\varphi$ determination processing part 504 sets the phase differences $\varphi$ of the switching periodic operations of the switching devices between the primary-side conversion circuit 20 and the secondary-side conversion circuit 30 to cause the power supply circuit 10 to function as a DC-DC converter circuit.

The turn-on time $\delta$ determination processing part 506 sets the turn-on times $\delta$ of the switching devices of the primary-side conversion circuit 20 and the secondary-side conversion circuit 30 to cause the primary-side conversion circuit 20 and the secondary-side conversion circuit 30 to function as boosting/stepping-down circuits, respectively.

The primary-side switching processing part 508 carries out switching control of the primary-side first upper arm U1, the primary-side first lower arm /U1, the primary-side second upper arm V1 and the primary-side second lower arm /V1 based on the outputs of the power conversion mode determination processing part 502, the phase difference $\varphi$ determination processing part 504 and the turn-on time $\delta$ determination processing part 506.

The secondary-side switching processing part 510 carries out switching control of the secondary-side first upper arm U2, the secondary-side first lower arm /U2, the secondary-side second upper arm V2 and the secondary-side second lower arm /V2 based on the outputs of the power conversion mode determination processing part 502, the phase difference $\varphi$ determination processing part 504 and the turn-on time $\delta$ determination processing part 506.

<Operations of Power Supply Apparatus 101>

Operations of the power supply apparatus 101 will now be described using FIGS. 1 and 2. For example, when an external signal requests the power supply circuit 10 to operate according to the power conversion mode F, the power conversion mode determination processing part 502 of the control part 50 determines the power, conversion mode of the power supply circuit 10 as the mode F. At this time, the power that is input to the second input/output port 60c is boosted through the boosting function of the primary-side conversion circuit 20, the power thus boosted is transmitted to the third input/output port 60b through the function of the DC-DC converter of the power supply circuit 10, further, the power is stepped down through the stepping-down function of the secondary-side conversion circuit 30, and the power is output from the fourth input/output port 60d.

The boosting/stepping-down function of the primary-side conversion circuit 20 will now be described in detail. Focusing on the second input/output port 60c and the first input/output port 60a, the terminal 616 of the second input/output port 60c is connected to the midpoint 207m of the primary-side first arm circuit 207 via the primary-side first winding 202a and the primary-side first reactor 204a connected to the first primary winding 202a in series. Also, both ends of the primary-side first arm circuit 207 are connected to the first input/output port 60a. Thus, it can be said that the boosting/stepping-down circuit is connected between the terminal 616 of the second input/output port 60c and the first input/output port 60a.

Also, the terminal 616 of the second input/output port 60c is connected to the midpoint 211m of the primary-side second arm circuit 211 via the second primary winding 202b and the primary-side second reactor 204b connected to the second primary winding 202b in series. Further, both ends of the primary-side second arm circuit 211 are connected to the first input/output port 60a. Thus, it can be said that the boosting/stepping-down circuits are connected in parallel between the terminal 616 of the second input/output port 60c and the first input/output port 60a. Note that, because the secondary-side conversion circuit 30 has approximately the same configuration as the primary-side conversion circuit 20, it can be said that the two boosting/stepping-down circuits are connected in parallel between the terminal 622 of the fourth input/output port 60d and the third input/output port 60b. As a result, the secondary-side conversion circuit 30 has the boosting/stepping-down function as the primary-side conversion circuit 20.

Next, the function of the power supply circuit 10 as the DC-DC converter circuit will be described in detail. Focusing on the first input/output port 60a and the third input/output port 60b, the primary-side full bridge circuit 200 is connected to the first input/output port 60a and the secondary-side full bridge circuit 300 is connected to the third input/output port 60b. Also, as a result of the primary coil 202 provided in the bridge part of the primary-side full bridge circuit 200 and the secondary coil 302 provided in the bridge part of the secondary-side full bridge circuit 300 being magnetically coupled to one another with a coupling coefficient $k_T$, the transformer 400 functions as a transformer of a center tap type having a winding turn ratio 1:N. Therefore, it is possible to convert the power that is input to the first input/output port 60a and transmit the converted power to the third input/output port 60b or convert the power that is input to the third input/output port 60b and transmit the converted power to the first input/output port 60a, by adjusting the phase differences $\varphi$ of the switching periodic operations of the switching devices in the primary-side full bridge circuit 200 and the secondary-side full bridge circuit 300.

Figure 3:
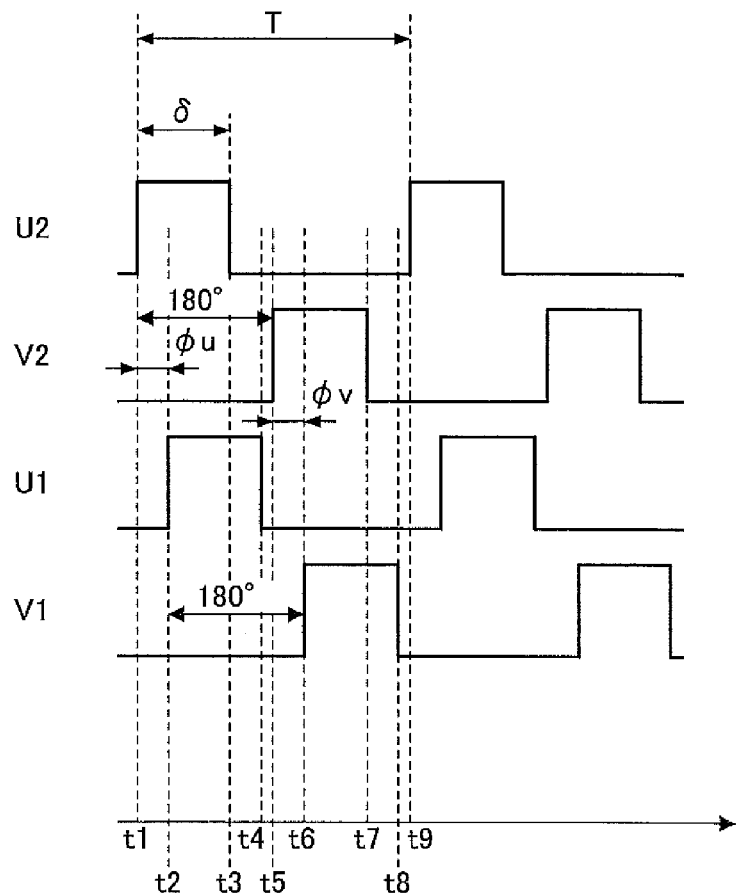
FIG. 3 is a timing chart illustrating a switching example in a primary-side circuit and a secondary-side circuit.

FIG. 3 illustrates a timing chart of a turning-on/off switching waveform of each arm included in the power supply circuit 10 appearing due to control of the control part 50. In FIG. 3, U1 denotes a turn-on/off waveform of the primary-side first upper arm U1; V1 denotes a turn-on/off waveform of the primary-side second upper arm V1; U2 denotes a turn-on/off waveform of the secondary-side first upper arm U2; and V2 denotes a turn-on/off waveform of the secondary-side second upper arm V2. Respective turn-on/off waveforms of the primary-side first lower arm /U1, the primary-side second lower arm /V1, the secondary-side first lower arm /U2 and the secondary-side second lower arm /V2 (not shown) are acquired from inverting the respective turn-on/off waveforms of the primary-side first upper arm U1, the primary-side second upper arm V1, the secondary-side first upper arm U2 and the secondary-side second upper arm V2, respectively. Note that it is preferable to provide dead times between the turn-on/off waveforms of the upper and lower arms in order to avoid passing through currents otherwise flowing due to simultaneous turning on of both upper and lower arms. In FIG. 3, the high level represents a turned-on state and the low level represents a turned-off state.

It is possible to change the boosting/stepping-down ratios of the primary-side conversion circuit 20 and the secondary-side conversion circuit 30 by changing the turn-on times δ of the respective U1, V1, U2 and V2. For example, by making the respective turn-on times δ of U1, V1, U2 and V2 equal to each other, it is possible to make the boosting/stepping-down ratios of the primary-side conversion circuit 20 and the boosting/stepping-down ratios of the secondary-side conversion circuit 30 equal.

The turn-on time δ determination processing part 506 makes the respective turn-on times δ of U1, V1, U2 and V2 equal to each other (i.e., each turn-on time δ=primary-side turn-on time $δ11$=secondary-side turn-on time $δ12$=time value δa) so as to make the boosting/stepping-down ratios of the primary-side conversion circuit 20 and the secondary-side conversion circuit 30 equal.

The boosting/stepping-down ratio of the primary-side conversion circuit 20 is determined by duty ratios D that are the proportions of the turn-on times δ to the switching periods T of the switching devices (arms) of the primary-side full bridge circuit 200. In the same way, the boosting/stepping-down ratio of the secondary-side conversion circuit 30 is determined by duty ratios D that are the proportions of the turn-on times δ to the switching periods T of the switching devices (arms) of the secondary-side full bridge circuit 300. The boosting/stepping-down ratio of the primary-side conversion circuit 20 is the voltage transformation ratio between the first input/output port 60a and the second input/output port 60c. The boosting/stepping-down ratio of the secondary-side conversion circuit 30 is the voltage transformation ratio between the third input/output port 60b and the fourth input/output port 60d.

Therefore, for example, boosting/stepping-down ratio of primary-side conversion circuit 20=(voltage of second input/output port 60c)/(voltage of first input/output port 60a)

=$δ11/T=δa/T$

Similarly, boosting/stepping-down ratio of secondary-side conversion circuit 30=(voltage of fourth input/output port 60d)/(voltage of third input/output port 60b)

=$δ12/T=δa/T$

Thus, the boosting/stepping-down ratios of the primary-side conversion circuit 20 and the secondary-side conversion circuit 30 are the same value (=δa/T).

Note that the turn-on time δ in FIG. 3 indicates the turn-on time $δ11$ of the primary-side first upper arm U1 and the primary-side second upper arm V1. Also, the turn-on time δ in FIG. 3 indicates the turn-on time $δ12$ of the secondary-side first upper arm U2 and the secondary-side second upper arm V2. Further, the switching period T of the arms in the primary-side full bridge circuit 200 and the switching period T of the arms in the secondary-side full bridge circuit 300 are the equal periods.

The switching devices are caused to operate with the phase difference between U1 and V1 that is, for example, 180 degrees (π). Also, the switching devices are caused to operate with the phase difference between U2 and V2 that is, for example, 180 degrees (π). The phase difference between U1 and V1 is a time difference between the time t2 and the time t6. The phase difference between U2 and V2 is a time difference between the time t1 and the time t5.

Further, it is possible to adjust the transmission power P transmitted between the primary-side conversion circuit 20 and the secondary-side conversion circuit 30 by changing at least one of the phase difference φu between U1 and U2 and the phase difference φv between V1 and V2. The phase difference φu is a time difference between the time t1 and the time t2. The phase difference φv is a time difference between the time t5 and the time t6.

The control part 50 is one example of a control part that controls the transmission power P transmitted between the primary-side full bridge circuit 200 and the secondary-side full bridge circuit 300 via the transformer 400 by adjusting the phase difference φu and the phase difference φv.

The phase difference φu is a time difference between switching of the primary-side first arm circuit 207 and switching of the secondary-side first arm circuit 307. For example, the phase difference φu is a difference between the time t2 of turning on the primary-side first upper arm U1 and the time t1 of turning on the secondary-side first upper arm U2. Switching the primary-side first arm circuit 207 and switching the secondary-side first arm circuit 307 are controlled by the control part 50 to be mutually in the same phase (i.e., in U-phase). Similarly, the phase difference φv is a time difference between switching the primary-side second arm circuit 211 and switching the secondary-side second arm circuit 311. For example, the phase difference φv is a difference between the time t6 of turning on the primary-side second upper arm V1 and the time t5 of turning on the secondary-side second upper arm V2. Switching the primary-side second arm circuit 211 and switching the secondary-side second arm circuit 311 are controlled by the control part 50 to be mutually in the same phase (i.e., in V-phase).

With the phase difference φu>0 or the phase difference φv>0, it is possible to transmit transmission power P from the primary-side conversion circuit 20 to the secondary-side conversion circuit 30. With the phase difference φu<0 or the phase difference φv<0, it is possible to transmit transmission power P from the secondary-side conversion circuit 30 to the primary-side conversion circuit 20. In other words, between the power conversion circuit parts of the same phase between the primary-side full bridge circuit 200 and the secondary-side full bridge circuit 300, transmission power P is transmitted from the full bridge circuit having the power conversion circuit part in which the upper arm is turned on earlier to the full bridge circuit having the power conversion circuit part in which the upper arm is turned on later.

In the case of FIG. 3 for example, the time t1 of turning on the secondary-side first upper arm U2 is earlier than the time t2 of turning on the primary-side first upper arm U1. Therefore, transmission power P is transmitted from the secondary-side full bridge circuit 300 including the secondary-side first arm circuit 307 having the secondary-side first upper arm U2 to the primary-side full bridge circuit 200 including the primary-side first arm circuit 207 having the primary-side first upper arm U1. Similarly, the time t5 of turning on the secondary-side second upper arm V2 is earlier than the time t6 of turning on the primary-side second upper arm V1. Therefore, transmission power P is transmitted from the secondary-side full bridge circuit 300 including the secondary-side second arm circuit 311 having the secondary-side second upper arm V2 to the primary-side full bridge circuit 200 including the primary-side second arm circuit 211 having the primary-side second upper arm V1.

The phase differences φ are deviations in timing (i.e., time lags) between the power conversion circuit parts of the same phases between the primary-side full bridge circuit 200 and the secondary-side full bridge circuit 300. For example, the phase difference φu is a deviation in switching timing between the corresponding phases between the primary-side first arm circuit 207 and the secondary-side first arm circuit 307. The phase difference φv is a deviation in switching timing between the corresponding phases between the primary-side second arm circuit 211 and the secondary-side second arm circuit 311.

The control part 50 normally carries out control where the phase difference φu and the phase difference φv are made equal to one another. However, control part 50 is allowed to carry out control where the phase difference φu and the phase difference φv are deviated from one another within a range where the preciseness required for transmission power P is satisfied. In other words, normally control is carried out in such a manner that the phase difference φu and the phase difference φv have the same values. However, if the preciseness required for transmission power P is satisfied, the phase difference φu and the phase difference φv can have mutually different values.

Therefore, for example, when an external signal requests the power supply circuit 10 to operate according to the power conversion mode F, the power conversion mode determination processing part 502 of the control part 50 determines the power conversion mode of the power supply circuit 10 as the mode F. Then, the turn-on time δ determination processing part 506 sets the turn-on times δ prescribing the boosting ratio for causing the primary-side conversion circuit 20 to function as a boosting circuit to boost the power that is input to the second input/output port 60c and output the boosted power to the first input/output port 60a. Note that the secondary-side conversion circuit 30 functions as a stepping-down circuit that steps down the power that is input to the third input/output port 60b with the stepping-down ratio prescribed by the turn-on times δ that are set by the turn-on time δ determination processing part 506 and outputs the stepped-down power to the fourth input/output port 60d. The phase difference φ determination processing part 504 sets the phase differences φ for boosting the power that is input to the first input/output port 60a and transmitting a desired power transmission amount of the boosted power to the third input/output port 60b.

The primary-side switching processing part 508 carries out switching control of the respective switching devices of the primary-side first upper arm U1, the primary-side first lower arm /U1, the primary-side second upper arm V1 and the primary-side second lower arm /V1 in such a manner as to cause the primary-side conversion circuit 20 to function as a boosting circuit and cause the primary-side conversion circuit 20 to function as a part of a DC-DC converter circuit.

The secondary-side switching processing part 510 carries out switching control of the respective switching devices of the secondary-side first upper arm U2, the secondary-side first lower arm /U2, the secondary-side second upper arm V2 and the secondary-side second lower arm /V2 in such a manner as to cause the secondary-side conversion circuit 30 to function as a stepping-down circuit and cause the secondary-side conversion circuit 30 to function as a part of a DC-DC converter circuit.

As mentioned above, it is possible to cause the primary-side conversion circuit 20 and the secondary-side conversion circuit 30 as boosting circuits or stepping-down circuits and also cause the power supply circuit 10 to function as a bidirectional DC-DC converter circuit. Therefore, it is possible to carry out power conversion according to any one of the power conversion modes A-L. In other words, it is possible to carry out power conversion between two input/output ports selected from among the four input/output ports.

Transmission power P (also referred to as a power transmission amount P) adjusted by the control part 50 according to the phase differences φ is power transmitted from one conversion circuit to another conversion circuit via the transformer 400 in the primary-side conversion circuit 20 and the secondary-side conversion circuit 30, and is expressed by the following Formula 1:

$$P=(N \times VA \times VB)/(\pi \times \omega \times L) \times F(D,\varphi) \qquad \text{Formula 1}$$

In Formula 1, N denotes the winding turn ratio of the transformer 400; VA denotes the port voltage of the first input/output port 60a; and VB denotes the port voltage of the third input/output port 60b. π denotes the circular constant. ω (=2π×f=2π/T) denotes an angular frequency of switching of the primary-side conversion circuit 20 and the secondary-side conversion circuit 30. f denotes a switching frequency of the primary-side conversion circuit 20 and the secondary-side conversion circuit 30. T denotes a switching period of the primary-side conversion circuit 20 and the secondary-side conversion circuit 30. L denotes an equivalent inductance of the magnetic coupling reactors 204 and 304 and the transformer 400 concerning power transmission. F(D,φ) denotes a function having the duty ratios D and the phase differences φ as variables and is a variable monotonically increasing as the phase differences φ increase without depending on the duty ratios D. The duty ratios D and the phase differences φ are control parameters that are designed to vary in ranges limited by predetermined upper and lower limits.

The control part 50 adjusts the transmission power P by changing the phase differences φ in such a manner that the port voltage Vp at, at least one predetermined port from among the primary-side ports and the secondary-side ports will converge to a target port voltage Vo. Therefore, the control part 50 can prevent the port voltage Vp from falling with respect to the target port voltage Vo by adjusting the transmission power P by changing the phase differences φ even when the consumption current at a load connected to the predetermined port increases.

For example, the control part 50 adjusts the transmission power P by changing the phase differences φ in such a manner that the port voltage Vp at a port of the primary-side ports or the secondary-side ports to which the transmission power P is transmitted will converge to the target port voltage Vo. Therefore, the control part 50 can prevent the port voltage Vp from falling with respect to the target port voltage Vo by adjusting transmission power P to increase it by changing the phase differences φ to increase them even when the consumption current at a load connected to the port to which the transmission power P is transmitted increases.

\<Method of Controlling Electric Power Conversion Apparatus\>

In FIG. 1, when a load to which power is supplied by the power supply circuit 10 via the port 60a generates regenerated power PR, regenerated power PR from the load 61a may be input to the port 60a. As a specific example of the load 61a which generates regenerated power PR, a motor used in an electric power steering device, a motor used in an electric stabilizer device or the like can be cited.

The voltage (the regenerated voltage VR) of regenerated power PR that is input to the port 60a from the load 61a may have various voltage values depending on the states of the load 61a (for example, a motor rotational speed or so). However, a voltage range where the main battery 62b or the auxiliary battery 62c is capable of recovering energy using regenerated power PR is limited to a predetermined range from a discharge final voltage to a charge final voltage.

The discharge final voltage means a terminal voltage of a battery at which a discharge is to be stopped. For example, the discharge final voltage is the terminal voltage appearing when the battery has been completely discharged. It is not possible to discharge a battery at a voltage less than the discharge final voltage. The charge final voltage means a terminal voltage of a battery at a time of the full charge (or the complete charge). In order to avoid overcharge of a battery, the battery is to be charged at a voltage less than or equal to the charge final voltage.

Further, when the winding turn ratio of the primary coil 202 and the secondary coil 302 is 1:N (N>1), regenerated power PR that is input from the port 60a is boosted N times by the transformer 400, and the boosted voltage is output to the port 60b. Therefore, where VBd denotes the discharge final voltage of the main battery 62b connected to the port 60b and VBc denotes the charge final voltage of the main battery 62b, the allowable range of the regenerated voltage VR that is input from the port 60a is determined to be a range greater than or equal to (VBd/N) and less than or equal to (VBc/N). Therefore, when regenerated voltage VR that is input from the port 60a is less than (VBd/N) or exceeds (VBc/N), the main battery 62b is not capable of recovering energy using the regenerated power PR that is input from the port 60a. Therefore, power futility may increase.

Figure 4:
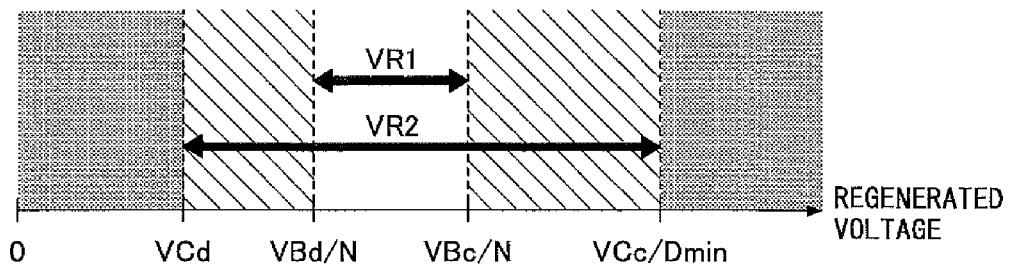
FIG. 4 illustrates one example of voltage ranges in which regenerated power can be used to charge batteries.

In order to avoid such power futility, the control part 50 determines that there is a possibility of being able to charge both the auxiliary battery 62c and the main battery 62b with regenerated power PR when the regenerated voltage detected by the sensor part 70 meets the condition (VBd/N)≤VR≤(VBc/N) as shown in FIG. 4. On the other hand, the control part 50 is capable of controlling the port voltage VC to a voltage less than the regenerated voltage VR (in other words, the product (D×VR) of the duty ratio D (≤1) and the regenerated voltage VR) by causing the primary-side full bridge circuit 200 to function as a stepping-down circuit. Therefore, the control part 50 determines that there is a possibility of being able to charge the auxiliary battery 62c with the regenerated power PR when the regenerated power PR detected by the sensor part 70 meets the condition VCd≤VR≤(VCc/Dmin), as shown in FIG. 4.

Note that VCd denotes the discharge final voltage of the auxiliary battery 62c; VCc denotes the charge final voltage of the auxiliary battery 62c; and Dmin denotes the lower limit of the duty ratio D of the primary-side full bridge circuit 200. The lower limit Dmin is the minimum value that the duty ratio D of the primary-side full bridge circuit 200 is allowed to have. The lower limit Dmin is, for example, a value determined by the resolution of PWM control, the operating frequency, the response speeds of the switching devices and/or the like.

Thus, the control part 50 is capable of determining a battery for which there is a possibility of charging with regenerated power PR depending on the voltage value VR of the regenerated power PR detected by the sensor part 70. Therefore, the control part 50 is capable of appropriately selecting a battery capable of recovering energy using the regenerated power PR.

The control part 50 is capable of determining that there is a possibility of being able to charge not only the main battery 62b but also the auxiliary battery 62c with regenerated power PR when the regenerated voltage VR meets the condition (VBd/N)≤VR≤(VBc/N). Thus, it is possible to increase candidates capable of recovering energy using the regenerated power PR. Further, the control part 50 is capable of determining that there is a possibility of being able to charge the auxiliary battery 62c with regenerated power PR when the regenerated voltage VR meets the condition VCd≤VR≤(VCc/Dmin). Thus, it is possible to widen the voltage range of being able to use regenerated power PR to recover energy from VR1 to VR2.

Figure 5:
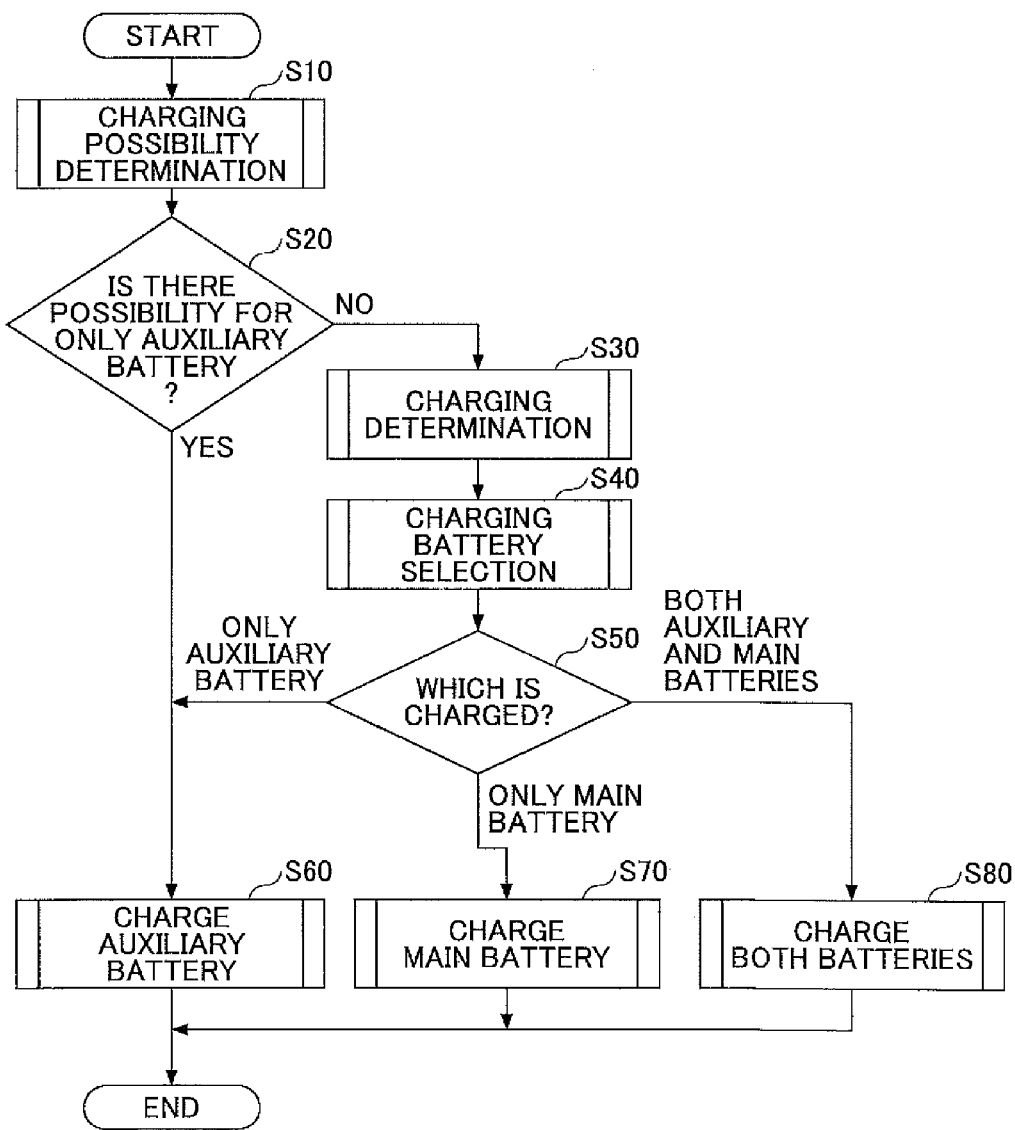
FIG. 5 is a flowchart illustrating one example of a method of controlling the electric power conversion apparatus.

FIG. 5 is a flowchart illustrating one example of a method of controlling the power supply apparatus 101. The control method illustrated in FIG. 5 is executed by the control part 50. The control part 50 controls the switching operations in the primary-side full bridge circuit 200 and the secondary-side full bridge circuit 300 in such a manner that regenerated power PR will be used to charge at least one of the auxiliary battery 62c and the main battery 62b. First, the control part 50 determines a battery for which there is a possibility of being able to charge with the regenerated power PR. According to the determination result, the control part 50 controls the switching operations in the primary-side full bridge circuit 200 and the secondary-side full bridge circuit 300.

In Step S10, when regenerated power PR is input from the port 60a, the control part 50 determines whether there is a possibility of being able to use the regenerated power PR to charge the main battery 62b or the auxiliary battery 62c. The control part 50 can determine that regenerated power PR is thus input from the port 60a by, for example, detecting at least one of an increase in the port voltage VA, an increase in the current flowing from the port 60a and an increase in the power flowing from the port 60a with the sensor part 70.

Figure 6:
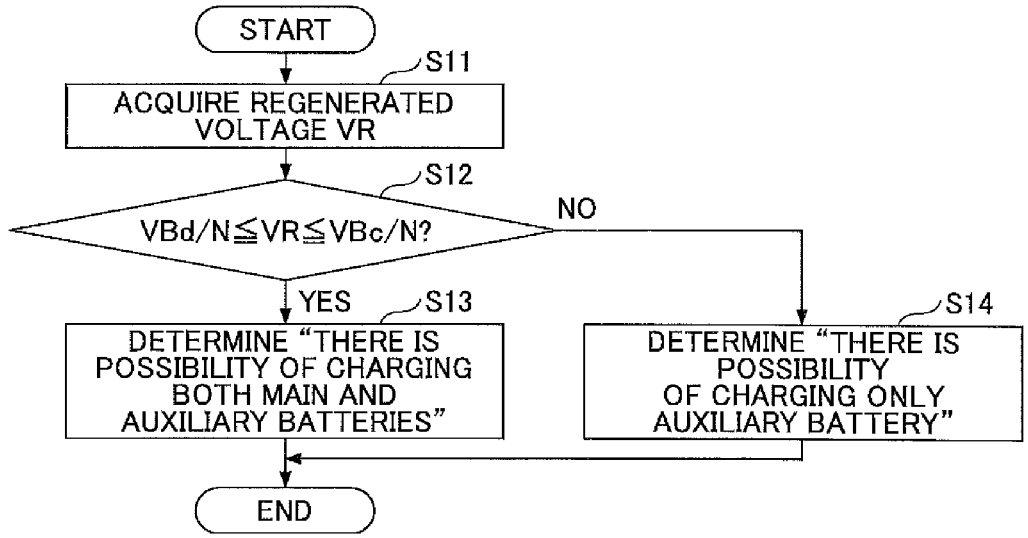
FIG. 6 is a flowchart illustrating one example of a method of determining whether there is a possibility of charging a battery with regenerated power.

FIG. 6 is a flowchart illustrating one example of Step S10 of determining whether there is a possibility of being able to use regenerated power PR to charge a battery.

In Step S11, the control part 50 acquires, as a regenerated voltage VR, the port voltage VA greater than or equal to a predetermined voltage value Vth from the sensor part 70, for example. Step S12, the control part 50 determines whether the regenerated voltage VR acquired from the sensor part 70 meets the condition (VBd/N)≤VR≤(VBc/N).

When having determined that the regenerated voltage VR acquired from the sensor part 70 meets the condition (VBd/N)≤VR≤(VBc/N), the control part 50 determines, in Step S13, that there is a possibility of being able to use the regenerated power PR to charge both the main battery 62b and the auxiliary battery 62c (see FIG. 4). On the other hand, when having determined that the regenerated voltage VR acquired from the sensor part 70 does not meet the condition (VBd/N)≤VR≤(VBc/N), the control part 50 determines, in Step S14, that the battery for which there is a possibility of being able to recover energy using the regenerated power PR is only the auxiliary battery 62c (see the hatched parts in FIG. 4).

Note that, in the configuration according to FIGS. 1 and 4, an adjustment is made such that a regenerated voltage VR less than VCd or exceeding (VCc/Dmin) which cannot be used even by the auxiliary battery 62c to recover energy will not be output from the side of the load 61a connected to the port 60a, in order to avoid a failure in the power supply circuit 10.

In Step S20 of FIG. 5, the control part 50 determines whether having determined, in Step S10, that the battery for which there is a possibility of being able to recover energy using the regenerated power PR is only the auxiliary battery 62c. When having determined that the battery for which there is a possibility of being able to recover energy using the regenerated power PR is only the auxiliary battery 62c, the control part 50 executes Step S60. On the other hand, when having determined that the battery for which there is a possibility of being able to recover energy using the regenerated power PR is not only the auxiliary battery 62c (i.e., there is a possibility of being able to use the regenerated power PR to charge both the auxiliary battery 62c and the main battery 62b), the control part 50 executes Step S30.

In Step S30, the control part 50 determines whether each of the main battery 62b and the auxiliary battery 62c can be actually charged with the regenerated power PR. The control part 50 can determine whether the battery can be charged with the regenerated power PR by determining, for example, whether the voltage that is applied to the battery because the regenerated power PR is input is greater than the terminal voltage of the battery. When the voltage that is applied to the battery because the regenerated power PR is input is greater than the terminal voltage of the battery, the control part 50 determines that it is possible to use the regenerated power PR to charge the battery. When the voltage that is applied to the battery because the regenerated power PR is input is less than the terminal voltage of the battery, the control part 50 determines that it is not possible to use the regenerated power PR to charge the battery. The terminal voltage of the battery is approximately equal to the voltage at the port to which the battery is connected.

Figure 7:
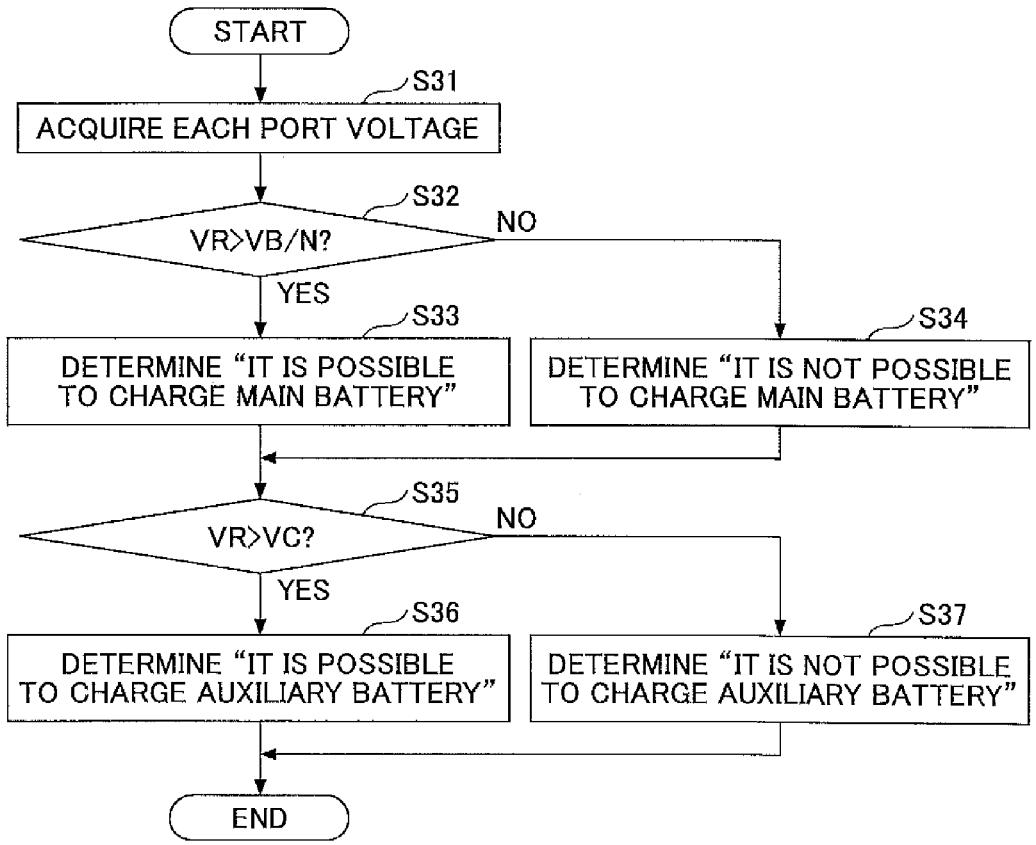
FIG. 7 is a flowchart illustrating one example of a method of determining whether it is possible to charge a battery with regenerated power.

FIG. 7 is a flowchart illustrating one example of the process of Step S30 of determining whether it is possible to use regenerated power PR to charge a battery.

In Step S32, the control part 50 determines whether it is possible to use regenerated power PR to charge the main battery 62b by determining whether the regenerated voltage VR detected in Step S11 is greater than (VB/N) acquired from dividing the port voltage VB detected by the sensor part 70 in Step S31 by N. This is because the control part 50 can determine to be able to use the regenerated power PR to charge the main battery 62b when the voltage of the regenerated power PR applied to the main battery 62b after the regenerated power PR is boosted N times by the transformer 400 is greater than the terminal voltage of the main battery 62b (in other words, the port voltage VB).

When having determined that the regenerated voltage VR is greater than VB/N, the control part 50 determines, in Step S33, that it is possible to use the regenerated power PR to charge the main battery 62b. On the other hand, when having determined that the regenerated voltage VR is less than or equal to VB/N, the control part 50 determines, in Step S34, that it is not possible to use the regenerated power PR to charge the main battery 62b.

In Step S35, the control part 50 determines whether it is possible to use the regenerated power PR to charge the auxiliary battery 62c by determining whether the regenerated voltage VR detected in Step S11 is greater than the port voltage VC detected by the sensor part 70 in Step S31. This is because the control part 50 can determine to be able to use the regenerated power PR to charge the auxiliary battery 62c when the voltage of the regenerated power PR applied to the auxiliary battery 62c after the regenerated power PR is stepped down according to the duty ratio D in the primary-side full bridge circuit 200 is greater than the terminal voltage of the auxiliary battery 62c (in other words, the port voltage VC). The duty ratio D can be controlled in the range from Dmin to 1.0. Therefore, when the regenerated voltage VR is greater than the port voltage VC, it is possible to use the regenerated power PR to charge the auxiliary battery 62c as a result of the duty ratio D being set, for example, to 1.0.

When having determined that the regenerated voltage VR is greater than VC, the control part 50 determines, in Step S36, that it is possible to use the regenerated power PR to charge the auxiliary battery 62c. On the other hand, when the regenerated voltage VR is less than or equal to VC, the control part 50 determines, in Step S37, that it is not possible to use the regenerated power PR to charge the auxiliary battery 62c.

Figure 8:
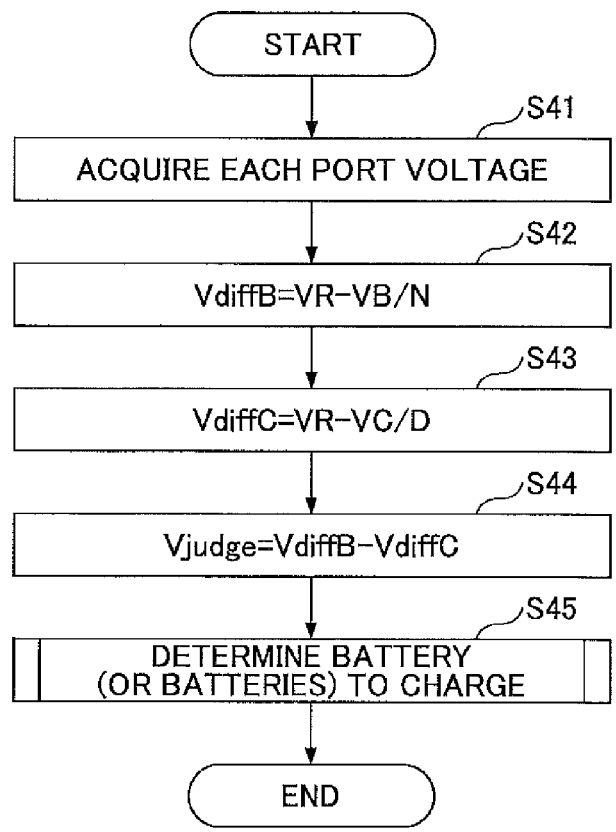
FIG. 8 illustrates one example of a method of selecting a battery to charge with regenerated power.

In Step S40 of FIG. 5, the control part 50 selects the battery (or batteries) to be actually charged with the regenerated power PR. FIG. 8 is a flowchart illustrating one example of the process of Step S40 of selecting the battery (or batteries) to be actually charged with the regenerated power PR.

In Step S42, the control part 50 calculates a first voltage difference VdiffB by subtracting, from the regenerated voltage VR detected in Step S11, the value (VB/N) acquired from dividing, by N, the port voltage VB detected in Step S41 by the sensor part 70. In Step S43, the control part 50 calculates a second voltage difference VdiffC by subtracting, from the regenerated voltage VR detected in Step S11, the value (VC/D) acquired from dividing, by the duty ratio D, the port voltage VC detected in Step S41 by the sensor part 70.

When VdiffB is greater than VdiffC, the difference between the voltage to be applied to the battery as a result of the regenerated power PR being input and the terminal voltage of the battery is greater for the main battery 62b than the auxiliary battery 62c. Therefore, when VdiffB is greater than VdiffC, the control part 50 is capable of charging the main battery 62b with the regenerated power PR more efficiently in a shorter time than changing the auxiliary battery 62c with the regenerated power PR, by causing the primary-side full bridge circuit 200 and the secondary-side full bridge circuit 300 to carry out operations of charging the main battery 62b with the regenerated power PR without charging the auxiliary battery 62c with the regenerated power PR.

On the other hand, when VdiffC is greater than VdiffB, the difference between the voltage to be applied to the battery as a result of the regenerated power PR being input and the terminal voltage of the battery is greater for the auxiliary battery 62c than the main battery 62b. Therefore, when VdiffC is greater than VdiffB, the control part 50 is capable of charging the auxiliary battery 62c with the regenerated power PR more efficiently in a shorter time than changing the main battery 62b with the regenerated power PR, by causing the primary-side full bridge circuit 200 and the secondary-side full bridge circuit 300 to carry out operations of charging the auxiliary battery 62c with the regenerated power PR without charging the main battery 62b with the regenerated power PR.

It is also possible that the control part 50 calculates a subtraction value Vjudge acquired from subtracting VdiffC from VdiffB as in Step S44. In this case, the control part 50 determines, in Step S45, the battery to be charged with the regenerated power PR according to the subtraction value Vjudge as shown in FIG. 9.

Figure 9:
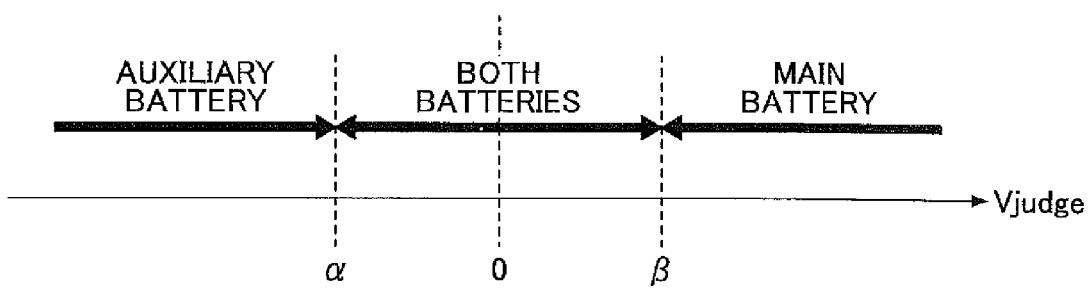
FIG. 9 illustrates one example of a criterion for selecting a battery to charge with regenerated power.

FIG. 9 illustrates one example of the relation between the subtraction value Vjudge and the battery (or batteries) to be charged with the regenerated power PR. The control part 50 selects the main battery 62b to be charged with the regenerated power PR when Vjudge is greater than or equal to a first threshold β (>0). The control part 50 selects the auxiliary battery 62c to be charged with the regenerated power PR when Vjudge is less than a second threshold α (<0) that is less than the first threshold β. The control part 50 selects both the auxiliary battery 62c and the main battery 62b to be charged with the regenerated power PR when Vjudge is greater than or equal to the threshold α and less than the threshold β.

When only the auxiliary battery 62c is selected in Step S40 to be charged with the regenerated power PR ("ONLY AUXILIARY BATTERY" in Step S50), the control part 50 charges only the auxiliary battery 62c with the regenerated power PR in Step S60. When only the main battery 62b is selected in Step S40 to be charged with the regenerated power PR ("ONLY MAIN BATTERY" in Step S50), the control part 50 charges only the main battery 62b with the regenerated power PR in Step S70. When both the auxiliary battery 62c and the main battery 62b are selected in Step S40 to be charged with the regenerated power PR ("BOTH AUXILIARY AND MAIN BATTERIES" in Step S50), the control part 50 charges both the auxiliary and main batteries 62c and 62b with the regenerated power PR in Step S80.

Figure 10:
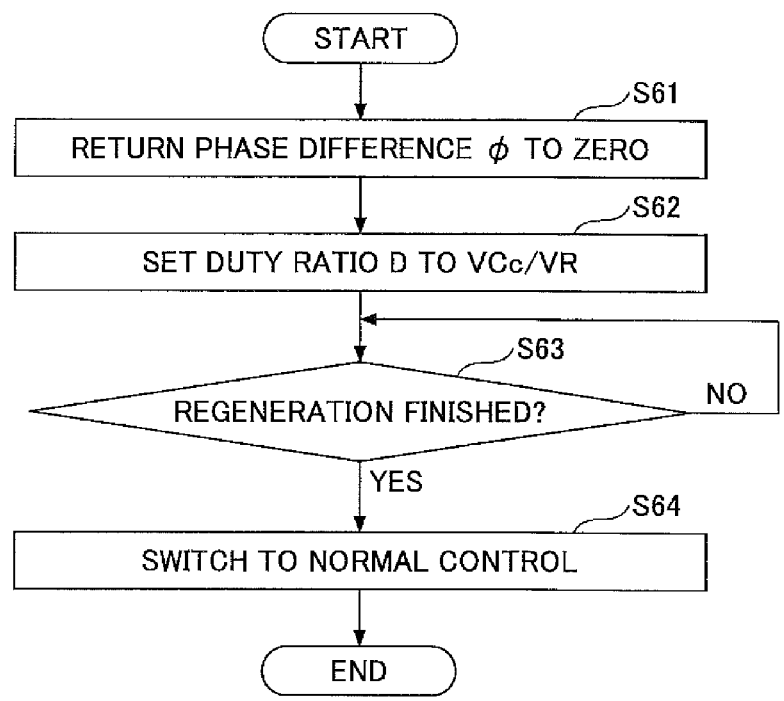
FIG. 10 is a flowchart illustrating one example of a method of charging an auxiliary battery with regenerated power.

FIG. 10 is a flowchart illustrating one example of the process of Step S60 in FIG. 5 of charging the auxiliary battery 62c with the regenerated power PR.

In Step S61, the control part 50 sets the phase difference φ to zero. As a result of the phase difference φ being thus set to zero, it is possible to prevent the transmission power P corresponding to the regenerated power PR from being transmitted to the secondary-side full bridge circuit 300 and prevent the regenerated power PR from being used to charge the main battery 62b.

In Step S62, the control part 50 sets the duty ratio D of the primary-side full bridge circuit 200 to the value (VCc/VR) acquired from dividing the charge final voltage VCc of the auxiliary battery 62c by the regenerated voltage VR detected in Step S11. As a result of VCc/VR being thus set as the duty ratio D of the primary-side full bridge circuit 200, it is possible to use the regenerated power PR to charge the auxiliary battery 62c at the charge final voltage VCc.

In Step S63, the control part 50 determines whether the input of the regenerated power PR to the port 60a has been finished. For example, the control part 50 determines that the input of the regenerated power PR to the port 60a has been finished when a fact that the regenerated voltage VR falls to become less than a predetermined voltage value Vth is detected by the sensor part 70.

When having determined that the input of the regenerated power PR to the port 60a has been finished, the control part 50 switches to carry out regular feedback operations of adjusting the phase difference φ to control the transmission power P and adjusting the duty ratio D to control the boosting/stepping-down ratios, in Step S64.

Figure 11:
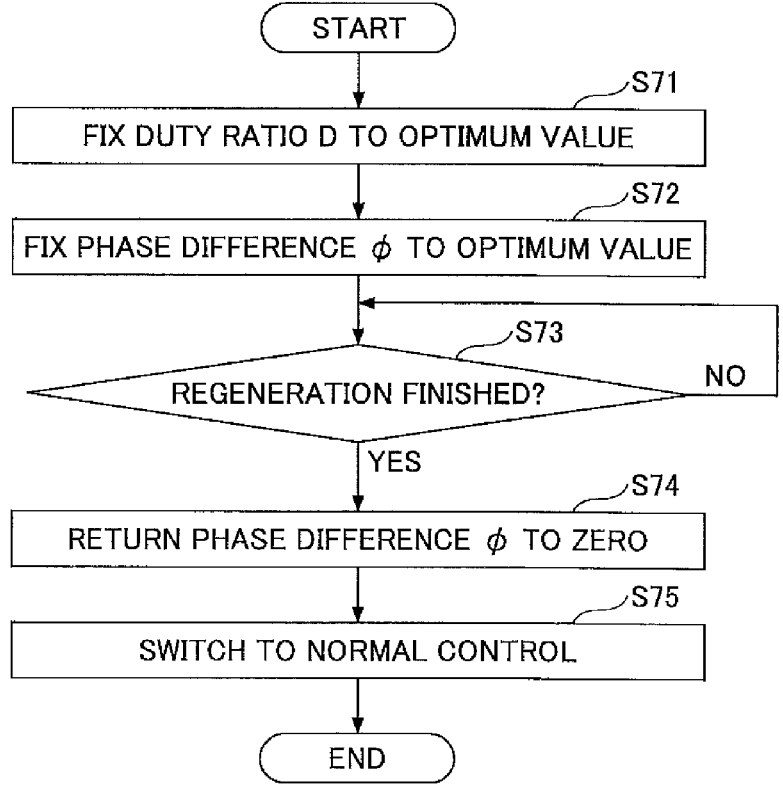
FIG. 11 is a flowchart illustrating one example of a method of charging a main battery with regenerated power.

FIG. 11 is a flowchart illustrating one example of the process of Step S70 in FIG. 5 of charging the main battery 62b with the regenerated power PR.

In Step S71, the control part 50 sets the duty ratio D of the primary-side full bridge circuit 200 to an optimum value (for example, 0.5) such that the transmission power P to be transmitted from the primary-side full bridge circuit 200 to the secondary-side full bridge circuit 300 becomes maximum. Similarly, in Step S72, the control part 50 sets the absolute value of the phase difference φ to an optimum value (for example, a predetermined upper limit) such that the transmission power P to be transmitted from the primary-side full bridge circuit 200 to the secondary-side full bridge circuit 300 becomes maximum. As a result of the duty ratio D and the phase difference φ being set to the optimum values, it is possible to reduce the time required for charging the main battery 62b with the regenerated power PR.

In Step S73, the control part 50 determines whether the input of the regenerated power PR to the port 60a has been finished. For example, the control part 50 determines that the input of the regenerated power PR to the port 60a has been finished when a fact that the regenerated voltage VR falls to become less than a predetermined voltage value Vth is detected by the sensor part 70.

When having determined that the input of the regenerated power PR to the port 60a has been finished, the control part 50 returns the phase difference φ to zero in Step S74, and then, in Step S75, switches to carry out regular feedback operations of adjusting the phase difference φ to control the transmission power P and adjusting the duty ratio D to control the boosting/stepping-down ratios.

According to the embodiment described above, it is possible to appropriately select a battery capable of recovering energy using regenerated power.

Thus, the electric power conversion apparatus and the method of controlling the same have been described in the embodiment. However, the present invention is not limited to the specific embodiment, and variations, modifications and/or replacements such as a partial or complete combination or replacement with another embodiment can be made at the embodiment without departing from the scope of the present invention.

For example, in the above-described embodiment, the power MOSFETs that are semiconductor devices performing turning-on/off operations are cited as the switching devices. However, as the switching devices, it is also possible to use voltage-controlled power devices using insulated gates such as IGBTs, MOSFETs and so forth, or bipolar transistors, instead.

Further, it is possible to provide a power source connectable to the first input/output port 60a. It is also possible to provide a power source connectable to the third input/output port 60b and provide no power source connectable to the fourth input/output port 60d. It is also possible to provide no power source connectable to the third input/output port 60b and provide a power source connectable to the fourth input/output port 60d.

Further, the present invention is applicable to an electric power conversion apparatus having at least three or more input/output ports and capable of converting power between at least any two of the three or more input/output ports. For example, the present invention can be applied to a power supply apparatus having such a configuration where any one input/output port from among the four input/output ports illustrated in FIG. 1 is omitted. For example, the fourth input/output port 60d can be omitted. When the fourth input/output port 60d is omitted, it is possible to omit the capacitor C4, the center tap 302m and the secondary-side magnetic coupling reactor 304.

Further, in the above description, it is possible to define the primary side as a secondary side and define the secondary side as a primary side. In the above description, the case where transmission power P is transmitted from the secondary-side port to the primary-side port has been illustrated. However, the above description can also be applied to a case where transmission power P is transmitted from the primary-side port to the secondary-side port.

The present application is based on and claims the benefit of priority of Japanese Priority Application No. 2014-080484, filed on Apr. 9, 2014, the entire contents of which are hereby incorporated herein by reference.

What is claimed is:

1. An electric power conversion apparatus comprising:
   a transformer having a winding turn ratio 1:N between a primary side and a secondary side;
   a primary-side full bridge circuit provided at the primary side of the transformer;
   a first port connected with the primary-side full bridge circuit;
   a second port connected with a center tap at the primary side of the transformer;
   a secondary-side full bridge circuit provided at the secondary side of the transformer;
   a third port connected with the secondary-side full bridge circuit; and
   a control part configured to control the primary-side full bridge circuit and the secondary-side full bridge circuit in such a manner that regenerated power that is input from the first port is used to charge at least one of a first battery connected with the second port and a second battery connected with the third port, wherein
   the control part is configured to, when the control part has determined that a condition (VBd/N)≤VR≤(VBc/N) is met, further determine whether to use the regenerated power to charge the first battery and the second battery and, when the control part has determined that a condition VCd≤VR≤(VCc/Dmin) is met, further determine whether to use the regenerated power to charge the first battery, where
   VR denotes a voltage of the regenerated power, VCd denotes a discharge final voltage of the first battery, VCc denotes a charge final voltage of the first battery, VBd denotes a discharge final voltage of the second battery, VBc denotes a charge final voltage of the second battery, N denotes the winding turn ratio of the transformer, and Dmin denotes a lower limit of a duty ratio D of the primary-side full bridge circuit.

2. The electric power conversion apparatus as claimed in claim 1, wherein
   the control part is configured to determine whether to charge the second battery with the regenerated power when the control part is to further determine whether to charge the first battery and the second battery with the regenerated power and a condition VR>(VB/N) is met, and
   the control part is configured to determine whether to charge the first battery with the regenerated power when the control part is to further determine whether to charge the first battery and the second battery with the regenerated power and a condition VR>VC is met, where
   VC denotes a voltage at the second port and VB denotes a voltage at the third port.

3. The electric power conversion apparatus as claimed in claim 1, wherein
   the control part is configured to charge the secondary battery with the regenerated power when a first voltage difference acquired from subtracting VB/N from VR is greater than a second voltage difference acquired from subtracting VC/D from VR, and charges the first battery with the regenerated power when the second voltage difference is greater than the first voltage difference, where
   VC denotes a voltage at the second port and VB denotes a voltage at the third port.

4. The electric power conversion apparatus as claimed in claim 2, wherein
   the control part is configured to charge the secondary battery with the regenerated power when a first voltage difference acquired from subtracting VB/N from VR is greater than a second voltage difference acquired from subtracting VC/D from VR, and charges the first battery with the regenerated power when the second voltage difference is greater than the first voltage difference.

5. The electric power conversion apparatus as claimed in claim 3, wherein
   the control part is configured to charge the second battery with the regenerated power when a subtraction acquired from subtracting the second voltage difference from the first voltage difference is greater than or equal to a first threshold, charge the first battery with the regenerated power when the subtraction is less than a second threshold that is less than the first threshold, and charge the first and the second batteries with the regenerated power when the subtraction is greater than or equal to the second threshold and less than the first threshold.

6. The electric power conversion apparatus as claimed in claim 4, wherein
   the control part is configured to charge the second battery with the regenerated power when a subtraction acquired from subtracting the second voltage difference from the first voltage difference is greater than or equal to a first threshold, charge the first battery with the regenerated power when the subtraction is less than a second threshold that is less than the first threshold, and charge the first and the second batteries with the regenerated power when the subtraction is greater than or equal to the second threshold and less than the first threshold.

7. The electric power conversion apparatus as claimed in claim 1, wherein
   the control part is configured to set a phase difference between switching in the primary-side full bridge circuit and switching in the secondary-side full bridge circuit to zero and set the duty ratio D to VCc/VR, when charging the first battery with the regenerated power.

8. The electric power conversion apparatus as claimed in claim 2, wherein
   the control part is configured to set a phase difference between switching in the primary-side full bridge circuit and switching in the secondary-side full bridge circuit to zero and set the duty ratio D to VCc/VR, when charging the first battery with the regenerated power.

9. The electric power conversion apparatus as claimed in claim 3, wherein
   the control part is configured to set a phase difference between switching in the primary-side full bridge circuit and switching in the secondary-side full bridge circuit to zero and set the duty ratio D to VCc/VR, when charging the first battery with the regenerated power.

10. The electric power conversion apparatus as claimed in claim 4, wherein the control part is configured to set a phase difference between switching in the primary-side full bridge circuit and switching in the secondary-side full bridge circuit to zero and set the duty ratio D to VCc/VR, when charging the first battery with the regenerated power.

11. The electric power conversion apparatus as claimed in claim 5, wherein
the control part is configured to set a phase difference between switching in the primary-side full bridge circuit and switching in the secondary-side full bridge circuit to zero and set the duty ratio D to VCc/VR, when charging the first battery with the regenerated power.

12. The electric power conversion apparatus as claimed in claim 6, wherein
the control part is configured to set a phase difference between switching in the primary-side full bridge circuit and switching in the secondary-side full bridge circuit to zero and set the duty ratio D to VCc/VR, when charging the first battery with the regenerated power.

13. The electric power conversion apparatus as claimed in claim 1, wherein
the control part is configured to set the duty ratio D and a phase difference between switching in the primary-side full bridge circuit and switching in the secondary-side full bridge circuit in such a manner that transmission power transmitted from the primary-side full bridge circuit to the secondary-side full bridge circuit becomes maximum, when charging the second battery with the regenerated power.

14. The electric power conversion apparatus as claimed in claim 2, wherein
the control part is configured to set the duty ratio D and a phase difference between switching in the primary-side full bridge circuit and switching in the secondary-side full bridge circuit in such a manner that transmission power transmitted from the primary-side full bridge circuit to the secondary-side full bridge circuit becomes maximum, when charging the second battery with the regenerated power.

15. The electric power conversion apparatus as claimed in claim 3, wherein
the control part is configured to set the duty ratio D and a phase difference between switching in the primary-side full bridge circuit and switching in the secondary-side full bridge circuit in such a manner that transmission power transmitted from the primary-side full bridge circuit to the secondary-side full bridge circuit becomes maximum, when charging the second battery with the regenerated power.

16. The electric power conversion apparatus as claimed in claim 4, wherein
the control part is configured to set the duty ratio D and a phase difference between switching in the primary-side full bridge circuit and switching in the secondary-side full bridge circuit in such a manner that transmission power transmitted from the primary-side full bridge circuit to the secondary-side full bridge circuit becomes maximum, when charging the second battery with the regenerated power.

17. The electric power conversion apparatus as claimed in claim 5, wherein
the control part is configured to set the duty ratio D and a phase difference between switching in the primary-side full bridge circuit and switching in the secondary-side full bridge circuit in such a manner that transmission power transmitted from the primary-side full bridge circuit to the secondary-side full bridge circuit becomes maximum, when charging the second battery with the regenerated power.

18. The electric power conversion apparatus as claimed in claim 6, wherein
the control part is configured to set the duty ratio D and a phase difference between switching in the primary-side full bridge circuit and switching in the secondary-side full bridge circuit in such a manner that transmission power transmitted from the primary-side full bridge circuit to the secondary-side full bridge circuit becomes maximum, when charging the second battery with the regenerated power.

19. A method of controlling an electric power conversion apparatus which includes a transformer having a winding turn ratio 1:N between a primary side and a secondary side, a primary-side full bridge circuit provided at the primary side of the transformer, a first port connected with the primary-side full bridge circuit, a second port connected with a center tap at the primary side of the transformer, a secondary-side full bridge circuit provided at the secondary side of the transformer, and a third port connected with the secondary-side full bridge circuit, the method comprising:
controlling the primary-side full bridge circuit and the secondary-side full bridge circuit in such a manner that regenerated power that is input from the first port is used to charge at least one of a first battery connected with the second port and a second battery connected with the third port, and
when having determined that a condition (VBd/N)≤VR≤(VBc/N) is met, further determining whether to use the regenerated power to charge the first battery and the second battery and, when having determined that a condition VCd≤VR≤(VCc/Dmin) is met, further determining whether to use the regenerated power to charge the first battery, where
VR denotes a voltage of the regenerated power, VCd denotes a discharge final voltage of the first battery, VCc denotes a charge final voltage of the first battery, VBd denotes a discharge final voltage of the second battery, VBc denotes a charge final voltage of the second battery, N denotes the winding turn ratio of the transformer, and Dmin denotes a lower limit of a duty ratio D of the primary-side full bridge circuit.

* * * * *